(12) United States Patent
Kiesewetter et al.

(10) Patent No.: US 9,758,024 B2
(45) Date of Patent: Sep. 12, 2017

(54) ROOF FRAME COMPONENT OF A ROOF OPENING SYSTEM OF A VEHICLE

(71) Applicant: Webasto SE, Stockdorf (DE)

(72) Inventors: Frank Kiesewetter, Germering (DE); Dirk Legler, Weil (DE); Martin Pollak, Puchheim (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 14/780,402

(22) PCT Filed: Mar. 25, 2014

(86) PCT No.: PCT/EP2014/055974
§ 371 (c)(1),
(2) Date: Sep. 25, 2015

(87) PCT Pub. No.: WO2014/166733
PCT Pub. Date: Oct. 16, 2014

(65) Prior Publication Data
US 2016/0052377 A1     Feb. 25, 2016

(30) Foreign Application Priority Data
Apr. 10, 2013  (DE) .......................... 10 2013 006 131

(51) Int. Cl.
*B60J 7/02*     (2006.01)
*B60J 7/04*     (2006.01)
*B60J 7/043*    (2006.01)

(52) U.S. Cl.
CPC ............... *B60J 7/043* (2013.01); *B60J 7/022* (2013.01)

(58) Field of Classification Search
CPC ...... B62D 25/06; B62D 29/04; B62D 29/043; B62D 29/046; B60J 7/022; B60J 7/043
USPC .................. 296/187.13, 193.12, 210, 216.06
See application file for complete search history.

(56) References Cited

U.S. PATENT DOCUMENTS

| 4,422,687 A | 12/1983 | Kaltz et al. | |
| 5,385,774 A * | 1/1995 | Cramer | B32B 5/26 296/100.01 |
| 6,296,301 B1 * | 10/2001 | Schroeder | B62D 29/046 296/187.02 |
| 6,499,797 B1 * | 12/2002 | Bohm | B29C 44/1252 296/191 |
| 6,663,172 B2 * | 12/2003 | Weiss | B60J 7/022 296/216.08 |

(Continued)

FOREIGN PATENT DOCUMENTS

| DE | 40 12 635 A1 | 10/1991 |
| DE | 297 05 440 U1 | 8/1998 |
| WO | 2012/132745 A1 | 10/2012 |

OTHER PUBLICATIONS

English Translation of the International Preliminary Report on Patentability, issued against International Application PCT/EP2014/055974.

(Continued)

*Primary Examiner* — Gregory Blankenship
(74) *Attorney, Agent, or Firm* — Fitch, Even, Tabin & Flannery, LLP

(57) ABSTRACT

The invention relates to a roof frame component of a roof opening system of a vehicle, wherein, according to the invention, said roof frame component is made of at least one organic sheet or has at least one organic sheet.

13 Claims, 6 Drawing Sheets

(56) References Cited

U.S. PATENT DOCUMENTS

| | | | | |
|---|---|---|---|---|
| 6,890,023 B2* | 5/2005 | Preisler | ............. | A61H 33/60 |
| | | | | 296/210 |
| 7,942,475 B2* | 5/2011 | Murray | ............. | B60J 7/022 |
| | | | | 296/210 |
| 9,016,775 B2* | 4/2015 | Gneiting | ............. | B62D 29/043 |
| | | | | 296/193.06 |
| 2003/0155796 A1* | 8/2003 | DePaulis | ............. | B60N 2/60 |
| | | | | 297/229 |
| 2003/0218363 A1* | 11/2003 | Strohmavr | ............. | B32B 17/04 |
| | | | | 296/210 |
| 2005/0116509 A1* | 6/2005 | Ido | ............. | B62D 25/06 |
| | | | | 296/210 |
| 2006/0152043 A1* | 7/2006 | Bonneau | ............. | B62D 25/02 |
| | | | | 296/210 |
| 2006/0232107 A1* | 10/2006 | Wieschermann | ... | B60R 13/0206 |
| | | | | 296/211 |
| 2008/0073943 A1 | 3/2008 | Pollak et al. | | |
| 2013/0313862 A1* | 11/2013 | Yamaji | ............. | B62D 25/025 |
| | | | | 296/203.01 |
| 2013/0313863 A1* | 11/2013 | Yamaji | ............. | B62D 25/00 |
| | | | | 296/203.01 |
| 2013/0341971 A1* | 12/2013 | Masini | ............. | B29C 70/86 |
| | | | | 296/210 |
| 2014/0084636 A1* | 3/2014 | Wimmer | ............. | B29C 44/146 |
| | | | | 296/216.07 |
| 2014/0300142 A1* | 10/2014 | Gneiting | ............. | B62D 29/043 |
| | | | | 296/210 |
| 2015/0129116 A1* | 5/2015 | Richeton | ............. | B60R 19/03 |
| | | | | 156/180 |
| 2015/0266518 A1* | 9/2015 | Donabedian | ......... | B62D 27/026 |
| | | | | 296/210 |
| 2015/0353140 A1* | 12/2015 | Bendiks | ............. | B62D 25/06 |
| | | | | 296/210 |
| 2015/0367794 A1* | 12/2015 | Nishimura | ............. | B62D 25/04 |
| | | | | 296/187.13 |
| 2016/0052377 A1* | 2/2016 | Kiesewetter | ............. | B60J 7/043 |
| | | | | 296/187.13 |

OTHER PUBLICATIONS

PCT International Search Report for International Application No. PCT/EP2014/055974 dated Jun. 5, 2014 (3 pages), and English translation (2 pages).

Second Office Action of corresponding Chinese Application No. 2014800206958 dated Mar. 20, 2017.

* cited by examiner

ROOF FRAME COMPONENT OF A ROOF OPENING SYSTEM OF A VEHICLE

CROSS-REFERENCE TO RELATED APPLICATIONS

This application is a U.S. national phase application filed under 35 U.S.C. §371 of International Application PCT/EP2014/055974, filed Mar. 25, 2014, designating the United States, which claims priority from German Application DE 10 2013 006 131.8, filed Apr. 10, 2013, which are all hereby incorporated herein by reference in their entirety.

FIELD

The invention relates to a roof frame component of a roof opening system of a vehicle.

BACKGROUND

Roof opening systems in the form of, e.g., sliding sunroofs or spoiler roofs of motor vehicles contain roof frame components or sliding roof frames, which are made of steel, for example, and which are of high strength and, when installed in the vehicle roof structure, can increase the strength of the vehicle body. However, a roof frame component of this type made of steel material has a relatively heavy weight. Although the weight of such a roof frame component can be reduced by using plastic, such as a thermoplastic, for example, in place of steel, a bulkier design is then required to achieve the necessary strength; however, this is not feasible due to the limited installation space in the vehicle roof.

A roof frame component known from DE 40 12 635 A1 contains a basic frame structure made of plastic, which has reinforcement plates in high load areas. Although such metallic reinforcement plates can increase the strength of the roof frame component, they counteract the weight savings achieved by using plastic.

SUMMARY

The object of the invention is to devise a roof frame component as specified in the introductory part, which is improved in terms of its design and has low weight and high strength.

This object is attained with the roof frame component according to the invention, as specified in the introductory part, in that the roof frame component is formed from at least one organic sheet or has at least one organic sheet.

Advantageous embodiments of the invention are specified in the dependent claims.

An organic sheet is a known component per se made of a fiber-reinforced semifinished product having a thermoplastic matrix, the fiber reinforcement being provided by continuous fibers. Continuous fibers are fibers, such as glass fibers or carbon fibers, for example, which are practically unlimited in length and which are worked, for example, into rovings or fibrous textiles.

By using an organic sheet to produce a roof frame component according to the invention, the relatively low density of a thermoplastic plastic is therefore combined with the rigidity of a fiber-reinforced organic sheet. In this manner, lightweight and rigid roof frame components, such as mounting frames and assembly frames for roof modules and roof systems that have limited installation space, for example, can be produced, or also reinforcement frames for covers of sliding sunroofs or the like. Thus the roof frame component can be a simple, elongated frame part or a complex frame structure having a plurality of frame sections connected to one another or produced as integral sections. In particular, the organic sheet itself forms substantially the entire roof frame component rather than being merely a reinforcement component supplementally attached to a frame component.

In particular, the roof frame component or the organic sheet can be designed to withstand heavy or excessive loads in the event of a crash. The strength of the roof frame component can be adapted to the roof structure, so that, e.g. the required strength of the vehicle roof as a whole is achieved once the roof frame component is mounted on the roof structure. Due to its high strength, an organic sheet can reliably withstand the forces introduced by the roof structure in the event of an accident. In addition to support sections of the roof frame component at the edges of the organic sheet, additional mounting points or the like may expediently be formed, or components for this purpose may be incorporated during production of the roof frame component, for example by injection molding, injection compression molding or compression molding.

In a preferred embodiment, the organic sheet having a thermoplastic matrix contains at least one profiled section or one profiled structure. The profiled section or profiled structure is characterized as any non-planar formation of the organic sheet, e.g. in the form of two sections or wall sections of the organic sheet, angled in relation to one another. It is particularly preferred for the organic sheet to be designed as multi-walled and particularly as groove-shaped in the profiled section. With a corresponding adjustment to the predominant direction of force introduction and force support, high strength is thereby achieved. The profiled section or profiled structure of the organic sheet is particularly designed as a U-profile, a double-U-profile, a W-U-profile or a Z-profile in cross-section. Other profiled designs are possible, of course.

High strength is also achieved when two organic sheets are connected to one another so as to form a hollow profile in cross-section. Furthermore, at least two organic sheets can also be arranged in double layers or in multiple layers, at least in some sections, and can especially be connected to one another securely and over a planar surface.

According to a particularly preferred embodiment, at least one reinforcement structure made of thermoplastic plastic is molded onto the at least one organic sheet. The molding is carried out, e.g. by injection molding or compression molding a prepared thermoplastic molded article in the tool mold during molding of the organic sheet. Additional functional parts can be molded in.

A respective reinforcement structure can be molded onto the organic sheet, preferably on both sides, or on an upper side and a lower side of the organic sheet. In particular, such a reinforcement structure is molded onto a profiled section or a profiled structure of the organic sheet, thereby increasing the strength at these locations. The reinforcement structure particularly prevents any relative movement or relative deformation of adjoining profiled wall sections. Expediently, the reinforcement structure contains reinforcement ribs or similar reinforcements. The reinforcement ribs can be, e.g. cross ribs, longitudinal ribs or diagonal ribs, in a simple or crossed arrangement in relation to the longitudinal extension of the roof frame component.

Furthermore, very high strength results when continuous fibers of a fabric or a mat of the organic sheet are oriented predominantly in the longitudinal direction of the frame sections of the roof frame component. Any tensile forces that occur can be reliably absorbed by the continuous fibers, which can withstand tensile loads.

The roof frame component can form a frame assembly of a roof opening system having at least one fixed or movable cover, or a reinforcement frame of such a cover, and is particularly formed as a U-shaped or closed frame.

Furthermore, in a preferred embodiment, the roof frame component can be formed as a frame assembly having a transverse frame reinforcement, which connects two opposing outer frame sections between two frame openings. This roof frame component can also be characterized as a figure-8 frame profile since, when viewed schematically, it has substantially the form of a "figure 8". The transverse frame reinforcement can also be formed as an organic sheet, which particularly has a reinforcement structure of the type described.

BRIEF DESCRIPTION OF THE DRAWINGS

In the following, the invention will be described in greater detail in the context of embodiments of roof frame components according to the invention, with reference to the set of drawings. The drawings show.

A roof frame component 1 (see FIGS. 1 and 2) of a vehicle, such as an automobile, forms a mounting frame and assembly frame of a roof module or roof system, on which at least one cover for closing a roof opening or frame opening 2 is movably or immovably mounted by means of a mounting device, not shown. The frame opening 2 is encompassed by a left and a right longitudinal frame section, 3 and 4, respectively, and by a front and rear transverse frame section, 5 and 6, respectively, of roof frame component 1, in an integral construction.

Figure 4:
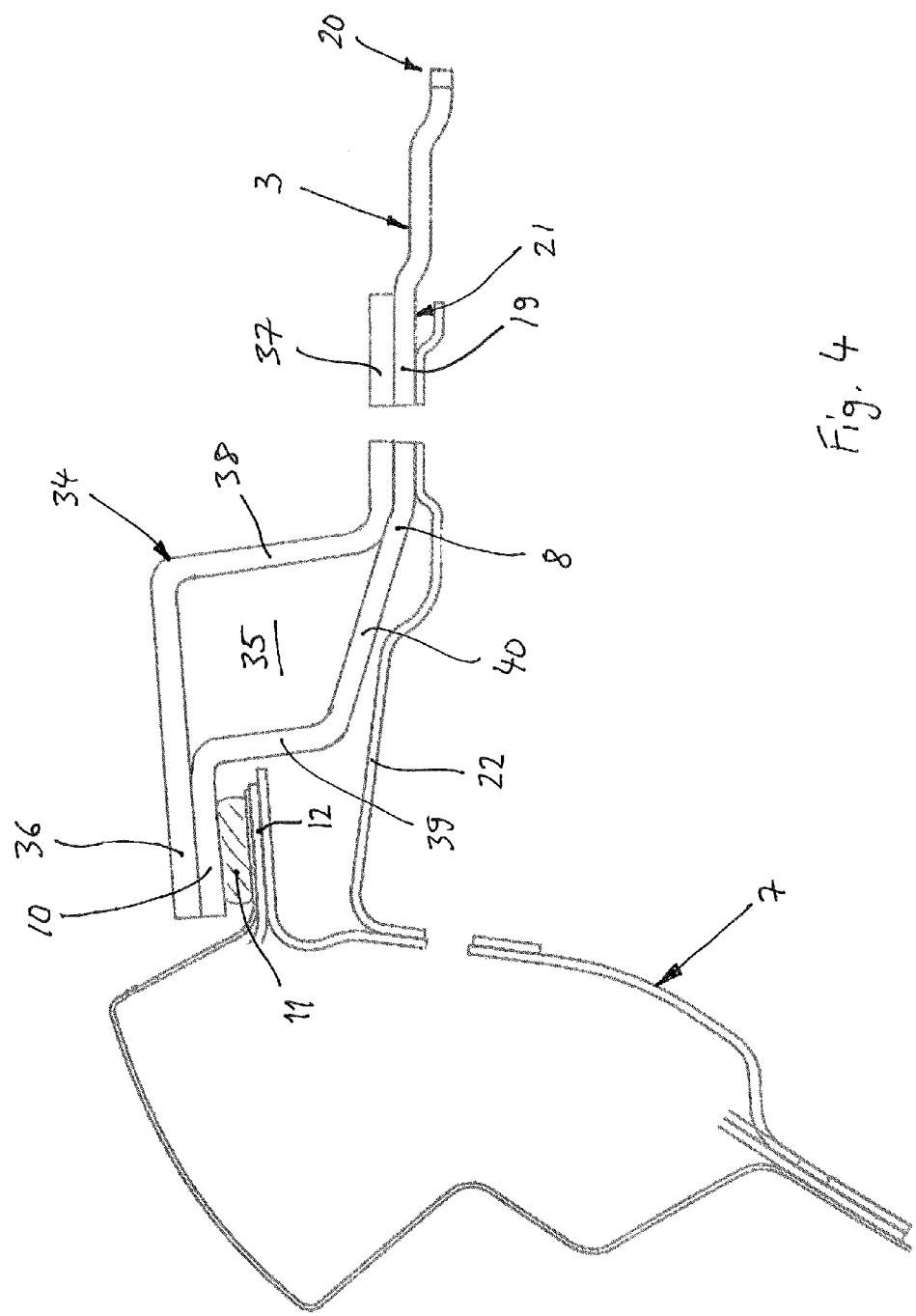
FIG. 4 is a cross-sectional view of a further embodiment of a frame section of a roof frame component, in the arrangement thereof on a longitudinal roof beam of a vehicle roof structure.
Figure 5:
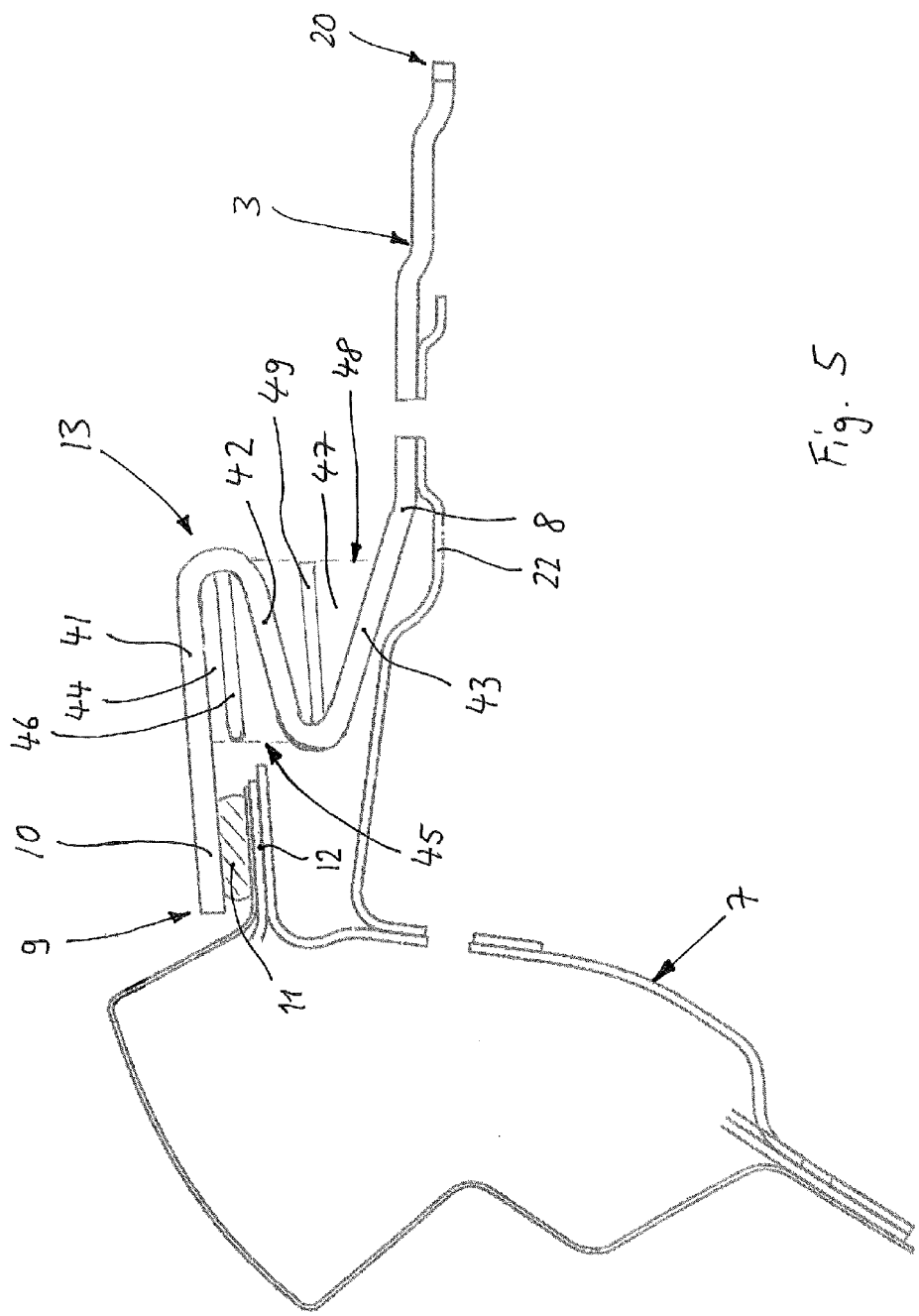
FIG. 5 is a cross-sectional view of a further embodiment of a frame section of a roof frame component, in the arrangement thereof on a longitudinal roof beam of a vehicle roof structure.

A roof frame component 1 of this type is attached to a roof structure of the vehicle body, and forms, e.g. a sliding sunroof or spoiler roof or the like. Each of FIGS. 3 to 5 schematically illustrates a longitudinal roof beam 7 of the vehicle roof structure, to which the longitudinal frame section 3 of a roof frame component 1 is attached.

Roof frame component 1 according to the invention is produced from an organic sheet 8, the organic sheet forms, e.g. as an integral part, the longitudinal frame sections 3 and 4 and transverse frame sections 5 and 6. In an alternative design, a plurality of organic sheets, in particular four, can also form roof frame component 1, in which case, e.g. each longitudinal frame section 3 and 4 and each transverse frame section 5 and 6 is made of an organic sheet, and the organic sheets are connected to one another, e.g. overlapping one another, at the corner areas of roof frame component 1.

Figure 2:
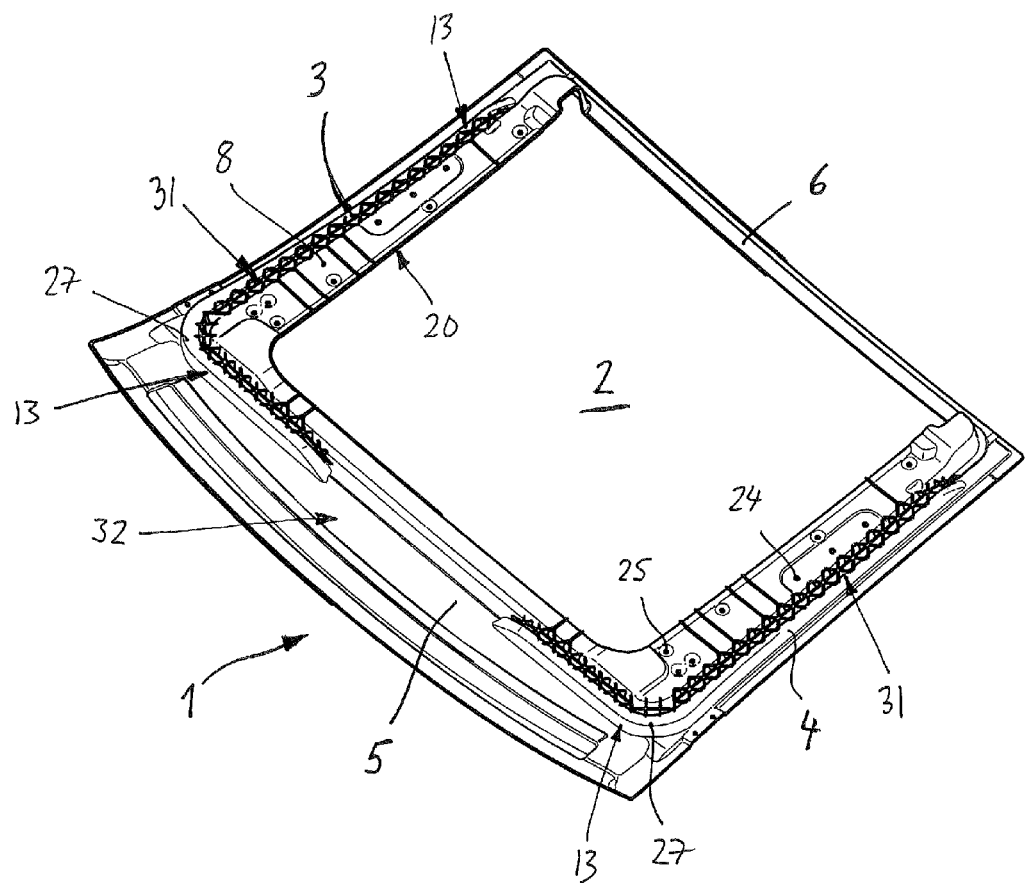
FIG. 2 is a perspective plan view of the bottom side of the roof frame component of FIG. 1.
Figure 3:
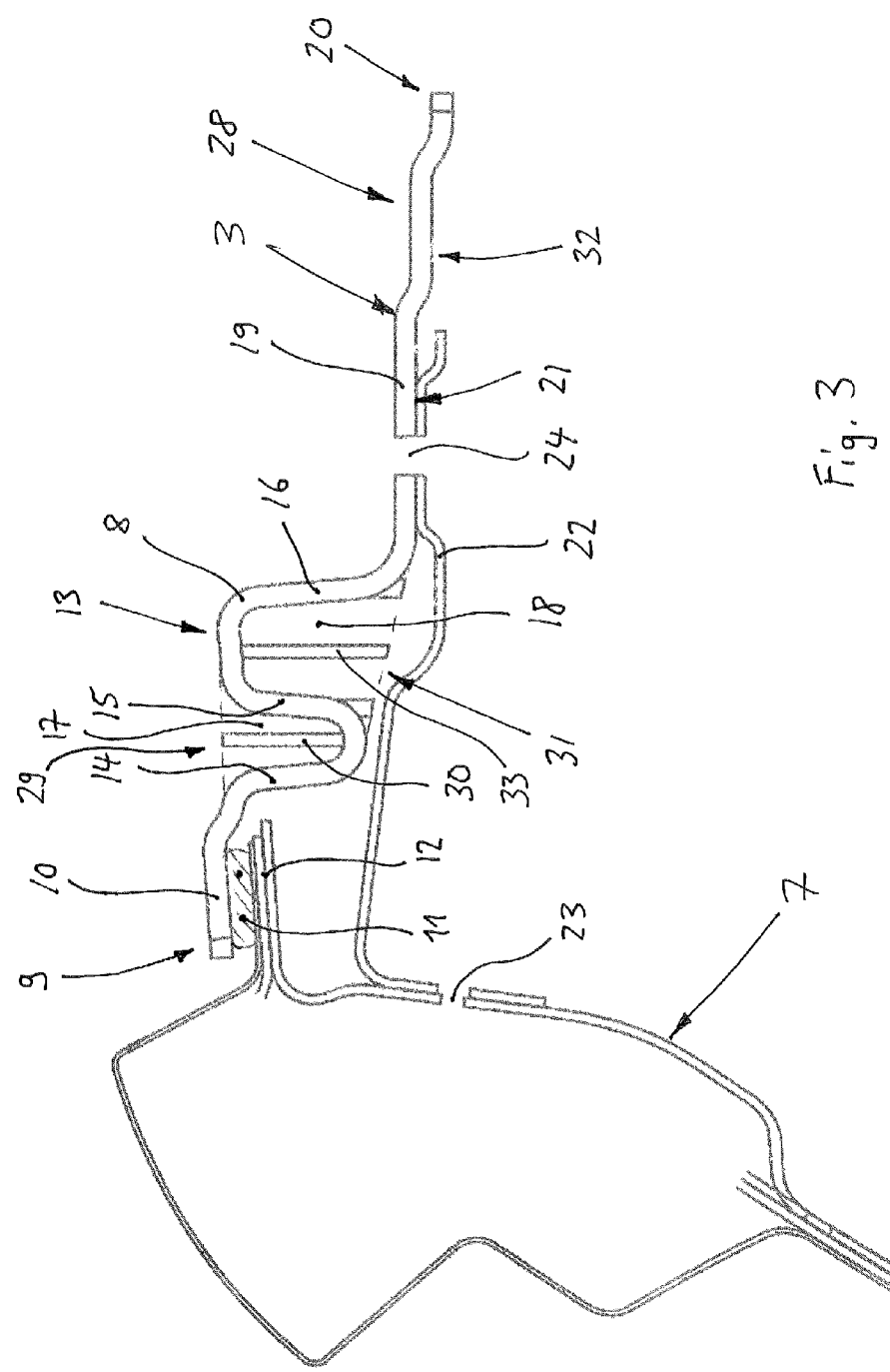
FIG. 3 is a cross-sectional view of a side frame section of the roof frame component of FIG. 1 along cut line A-A, in the arrangement thereof on a longitudinal roof beam of a vehicle roof structure.

Organic sheet 8 or roof frame component 1 is formed as a profiled piece, shown in FIG. 3, at least over a longitudinal section of longitudinal frame section 3. At the outer edge 9 of roof frame component 1, said organic sheet forms a flat fastening strip 10, with which it is mounted by means of an adhesive bead 11 or the like onto a flange 12 of longitudinal roof beam 7. Toward the inside from fastening strip 10, a multi-walled profiled structure 13 is formed, on which organic sheet 8 is formed with three approximately parallel wall sections 14, 15 and 16, forming an outer U-profile 17 that is open toward the top, and immediately adjacent thereto, a U-profile 18 that is open toward the bottom. Inner wall section 16 extends lower on roof frame component 1 than the two adjacent wall sections 14 and 15, and transitions into an approximately horizontal component leg 19, which extends up to the inner edge 20 that delimits frame opening 2, and at this location forms a contact face 21 for a mounting plate 22 or crash plate, which is connected on one side to longitudinal roof beam 7 by means of screws in a plurality of boreholes 23, and on the other side to organic sheet 8 by means of screws in a plurality of boreholes 24, formed in component leg 19 of organic sheet 8. Near inner edge 20, component leg 19 contains a plurality of boreholes 25 (see FIGS. 1 and 2) in which, e.g. a guide rail (not shown) of a bearing device for a movable cover can be mounted.

High strength against deformation under an introduction of excessive force, e.g. in the event of an accident, in which forces act particularly laterally on the longitudinal frame section 3, 4, is provided by the arrangement of the multi-walled profiled structure 13 with the three approximately parallel wall sections 14, 15 and 16 of the organic sheet 8.

Figure 1:
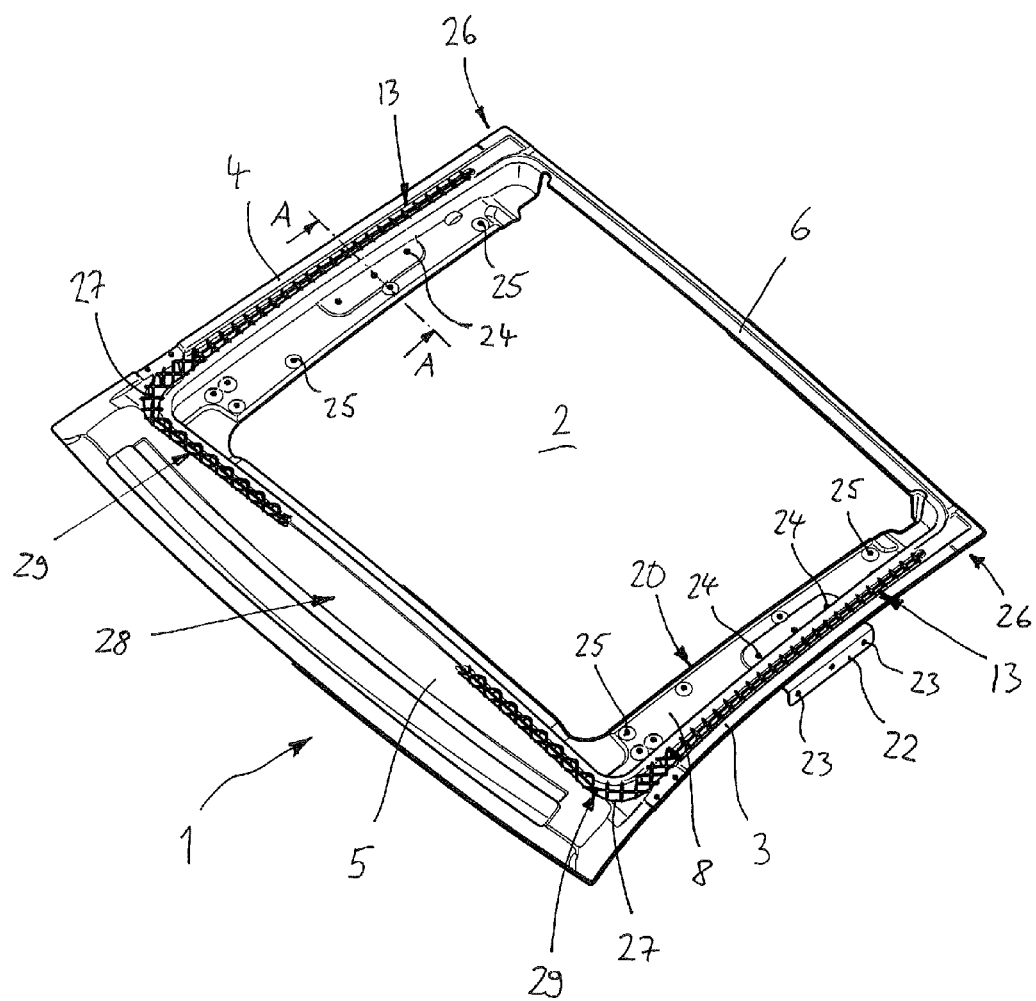
FIG. 1 is a perspective plan view of a roof frame component.

In roof frame component 1 shown in FIGS. 1 and 2, said profiled structure 13 having the two U-profiles 17 and 18 extends on each side longitudinal frame section 3 and 4 from nearly the rear corner area 26 forward and along a curve 27 into front transverse frame section 5, and inward over approximately one-third of the length thereof, toward the frame center.

Roof frame component 1 further has at least one reinforcement structure, which contains, e.g. reinforcement ribs made of a thermoplastic plastic. The embodiment of roof frame component 1 shown in FIGS. 1 and 2 contains, on its upper side 28, a reinforcement structure 29, which is arranged in the U-profile 17 that is open toward the top, and which has reinforcement ribs 30, which are formed, for example, as transverse ribs transversely to the longitudinal extension of the U-profile 17 and/or are formed as crossing diagonal ribs. A further reinforcement structure 31 is arranged on the bottom side 32 of roof frame component 1 in the U-profile 18 that is open toward the bottom, and likewise contains reinforcement ribs 33, which can also be formed as transverse ribs and/or diagonal ribs. Reinforcement structures 29 and 31 and reinforcement ribs 30 and 33 are securely connected to the plastic matrix of organic sheet 8.

The multi-walled profiled structure 13 having the two U-profiles 17 and 18 in combination with the at least one reinforcement structure 29 and 31 therefore offers maximum resistance to deformation with a relatively low weight.

In a further embodiment (see FIG. 4), an additional organic sheet 34 is attached to organic sheet 8 of roof frame component 1, forming a hollow profile 35. The additional organic sheet 34 is attached with an outer leg 36 to the upper side of fastening strip 10 of organic sheet 8 and is attached with an inner leg 37 to component leg 19 of organic sheet 8 opposite contact face 21. Hollow profile 35, which is particularly closed in cross-section, is formed on one side by upper outer leg 36 and an approximately vertical intermediate wall 38 of the additional organic sheet 34, and on the other side by outer wall 39 and a lower leg 40 of organic sheet 8, and offers high strength against deformation.

In a further embodiment (see FIG. 5), in contrast to the embodiment shown in FIG. 3, profiled structure 13 of organic sheet 8 is modified to an approximately Z-shaped structure, in which the extension of fastening strip 10 forms an upper wall section 41 of profiled structure 13, which transitions after a turn to a center wall section 42 that extends outward, after which its shape transitions again into a lower wall section 43 that is directed inward. In the groove of upper U-profile or V-profile 44, formed by upper wall section 41 and center wall section 42, which groove is open toward the outside, an outer reinforcement structure 45 with reinforcement ribs 46 is arranged. In the groove of lower U-profile or V-profile 47, formed by center wall section 42 and lower wall section 43, which groove is open toward the inside, an inner reinforcement structure 48 with reinforcement ribs 49 is arranged. The two reinforcement structures 45 and 48 are designed in principle according to the two reinforcement structures 29 and 31 described in reference to FIG. 3, and are connected to organic sheet 8.

Additional modifications and designs of profiled structure 13 having the same number of wall sections or even additional wall sections, which can also be longer or shorter in cross-section, are possible in principle, and can be designed in accordance with the forces to be withstood, wherein a plurality of wall sections arranged side by side can increase the strength and rigidity of the roof frame component and/or the organic sheet while having a light weight. The at least one reinforcement structure is particularly attached or connected to the special profiled structure of the organic sheet, but can also be arranged on flat sections.

Figure 6:
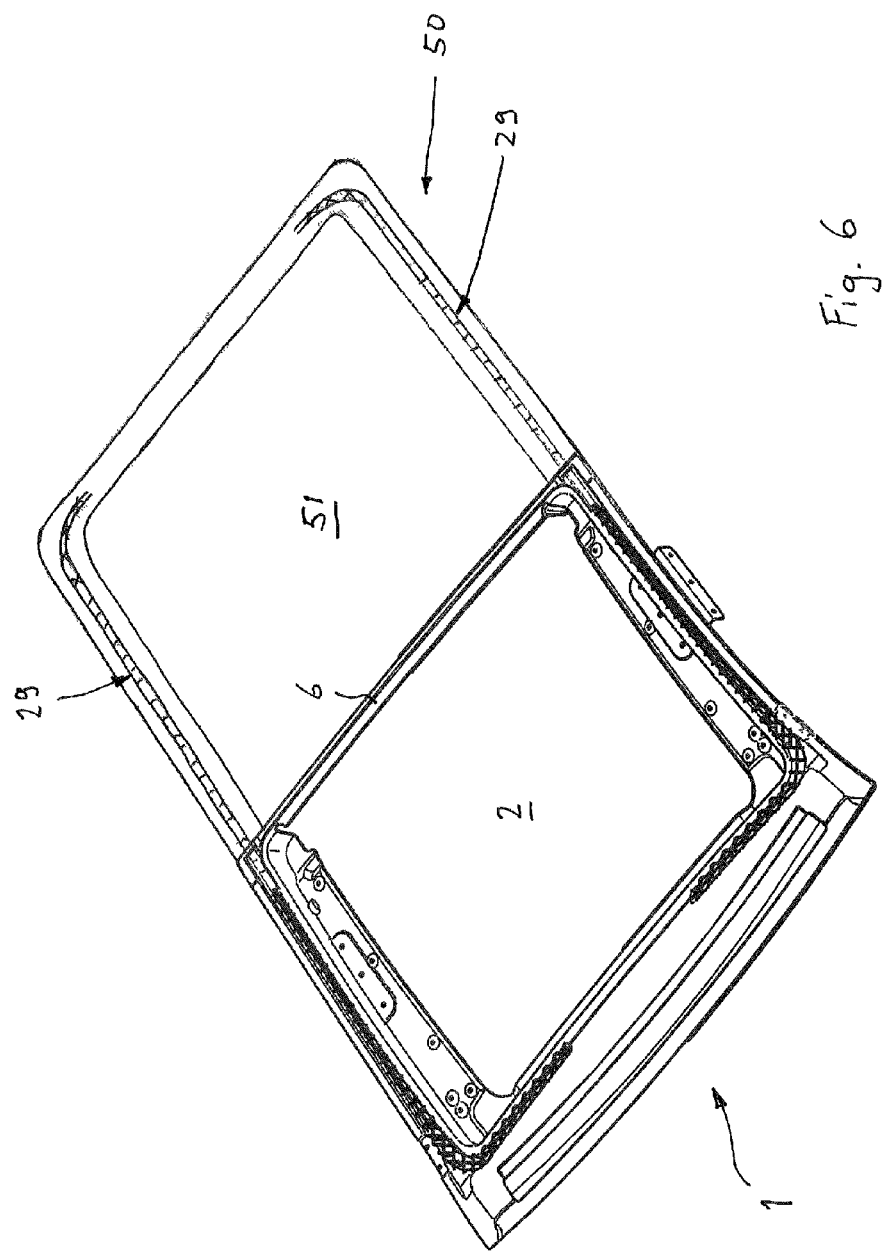
FIG. 6 is a perspective plan view of an additional embodiment of a roof frame component.

Roof frame component 1 is particularly a closed frame component having four frame side parts, such as longitudinal frame sections 3 and 4 and transverse frame sections 5 and 6, but can also be simply a frame structure having one frame part such as a side frame part. Roof frame component 1 according to the invention can also be formed, e.g. in a U-shape with three side frame parts, or a closed frame component is also subdivided by an inner transverse frame component, and forms, e.g. a mounting and assembly frame of a roof system having two frame openings for two covers, arranged one in front of the other. FIG. 6 shows a roof frame component of this type, which contains, e.g., the roof frame component 1 shown in FIG. 1, to which a second closed rear frame assembly 50, which encompasses a rear frame opening 51, has been added.

In producing roof frame component 1, the continuous fibers of the semifinished product of organic sheet 8, 34 are particularly arranged such that they are oriented along the longitudinal extension of the individual frame sections. The fibers are then exposed predominantly to tensile forces when force is introduced, and are able to withstand such tensile forces.

Mounting plate 22 can be securely attached to organic sheet 8 or to component leg 19 thereof for the purpose of withstanding strong forces, and, due to the high strength of the organic sheet, the risk of the immediate mounting area of component leg 19 breaking loose is substantially reduced as compared with a known roof frame component made of simple unreinforced thermoplastic plastic.

The individual features of the invention disclosed in the description and in reference to the embodiments and those disclosed in the figures can be combined in any technically expedient arrangements and configurations with the subject matter of the invention in its general form.

| List of Reference Signs | |
|---|---|
| 1 | Vehicle roof frame component |
| 2 | Frame opening |
| 3 | Left longitudinal frame section |
| 4 | Right longitudinal frame section |
| 5 | Front transverse frame section |
| 6 | Rear transverse frame section |
| 7 | Longitudinal roof beam |
| 8 | Organic sheet |
| 9 | Outer edge |
| 10 | Fastening strip |
| 11 | Adhesive bead |
| 12 | Flange |
| 13 | Profiled structure |
| 14 | Wall section |
| 15 | Wall section |
| 16 | Wall section |
| 17 | U-profile |
| 18 | U-profile |
| 19 | Component leg |
| 20 | Inner edge |
| 21 | Contact face |
| 22 | Mounting plate |
| 23 | Borehole |
| 24 | Borehole |
| 25 | Borehole |
| 51 | Rear frame opening |
| 26 | Corner area |
| 27 | Curve |
| 28 | Upper side |
| 29 | Reinforcement structure |
| 30 | Reinforcement rib |
| 31 | Reinforcement structure |
| 32 | Bottom side |
| 33 | Reinforcement rib |
| 34 | Organic sheet |
| 35 | Hollow profile |
| 36 | Outer leg |
| 37 | Inner leg |
| 38 | Intermediate wall |
| 39 | Outer wall |
| 40 | Leg |
| 41 | Upper wall section |
| 42 | Center wall section |
| 43 | Bottom wall section |
| 44 | Upper U-profile or V-profile |
| 45 | Outer reinforcement structure |
| 46 | Reinforcement rib |
| 47 | Lower U-profile or V-profile |
| 48 | Inner reinforcement structure |
| 49 | Reinforcement rib |
| 50 | Rear frame assembly |
| 51 | Rear frame opening |

The invention claimed is:

1. A roof frame component of a roof opening system of a vehicle, wherein the roof frame component is formed from at least one organic sheet or has at least one organic sheet, and in that continuous fibers of a fabric or a mat of the organic sheet are oriented predominantly in a longitudinal direction of frame sections of the roof frame component.

2. The roof frame component according to claim 1, wherein the roof frame component or the at least one organic sheet is designed to withstand high loads in the event of a crash.

3. The roof frame component according to claim 1, wherein the at least one organic sheet which has a thermoplastic matrix has at least one profiled section.

4. The roof frame component according to claim 3, wherein the at least one organic sheet is formed as multi-walled and groove-shaped in the profiled section.

5. The roof frame component according to claim 1, wherein the at least one organic sheet profile is selected from the group consisting of a U-profile, a double-U-profile, a W-U-profile and a Z-profile in cross-section.

6. The roof frame component according to claim 1, wherein the at least one organic sheet comprises at least two organic sheets connected to one another form a hollow profile in cross-section.

7. The roof frame component according to claim 6, wherein at least two organic sheets are arranged in double layers or multiple layers, at least in sections.

8. The roof frame component according to claim 1, wherein at least one reinforcement structure made of thermoplastic plastic is molded onto the at least one organic sheet.

9. The roof frame component according to claim 8, wherein the at least one reinforcement structure is molded onto both sides of the organic sheet or onto an upper side and a lower side of the at least one organic sheet.

10. The roof frame component according to claim 8, wherein the reinforcement structure has reinforcement ribs.

11. The roof frame component according to claim 1, wherein the roof frame component forms a frame assembly of a roof opening system having at least one fixed or movable cover, or forms a reinforcement frame for such a cover, and is formed as a U-shaped or closed frame.

12. The roof frame component according to claim 1, wherein the roof frame component is formed as a frame assembly having a transverse frame reinforcement, which connects two mutually opposite outer frame sections between two frame openings.

13. The roof frame component according to claim 12 wherein the transverse frame reinforcement is formed as an organic sheet, which particularly has a reinforcement structure.

* * * * *